US006796466B2

(12) United States Patent
Essig

(10) Patent No.: US 6,796,466 B2
(45) Date of Patent: Sep. 28, 2004

(54) SPARE TIRE CARRIER FOR A VEHICLE

(75) Inventor: Richard C. Essig, Berthoud, CO (US)

(73) Assignee: Bestop, Inc., Broomfield, CO (US)

(*) Notice: Subject to any disclaimer, the term of this patent is extended or adjusted under 35 U.S.C. 154(b) by 250 days.

(21) Appl. No.: 10/032,854

(22) Filed: Oct. 26, 2001

(65) Prior Publication Data

US 2002/0084298 A1 Jul. 4, 2002

Related U.S. Application Data

(60) Provisional application No. 60/244,033, filed on Oct. 27, 2000.

(51) Int. Cl.[7] .............................................. B62D 43/02
(52) U.S. Cl. ............................... 224/42.21; 224/42.24; 224/509; 414/465
(58) Field of Search ......................... 224/42.21, 42.24, 224/501, 509, 557; 414/463, 465; 296/146.11

(56) References Cited

U.S. PATENT DOCUMENTS

| | | | |
|---|---|---|---|
| 3,845,891 A | * 11/1974 | Becher | 224/42.21 |
| 4,042,157 A | * 8/1977 | Weiler | 224/42.21 |
| 4,278,191 A | 7/1981 | Mecham | |
| 4,418,851 A | 12/1983 | Ankeny | |
| 4,485,945 A | 12/1984 | Ankeny | |
| 4,869,409 A | * 9/1989 | Wright | 224/42.24 |
| 4,976,386 A | * 12/1990 | Geiger | 224/509 |
| 5,020,707 A | 6/1991 | Nozel et al. | |
| 5,074,611 A | * 12/1991 | Newkirk | 296/146.11 |
| 5,333,766 A | 8/1994 | Fisher et al. | |
| 5,385,383 A | * 1/1995 | Kreis et al. | 296/146.11 |
| 5,538,168 A | * 7/1996 | Burger et al. | 224/42.24 |
| 5,967,389 A | * 10/1999 | Hutter et al. | 224/42.21 |
| 6,189,748 B1 | * 2/2001 | Hutter et al. | 224/42.21 |

* cited by examiner

Primary Examiner—Gary E. Elkins
(74) Attorney, Agent, or Firm—W. Scott Carson

(57) ABSTRACT

A carrier for the spare tire of a sport utility vehicle. The carrier includes a pair of additional hinges mounted to the vehicle body just outside the rear gate and an arrangement of leg members that moves in unison with the rear gate as it is opened and closed. The spare tire is mounted on the arrangement of leg members which includes an adjustable leg member which not only helps to properly align the spare tire with the vertical but also can be used to correct or offset any sag that might develop in the rear gate. It can also be used to vary the relative amounts of the tire's weight being supported by the gate including its hinges versus being supported by the body of the vehicle at the hinges for the carrier.

38 Claims, 9 Drawing Sheets

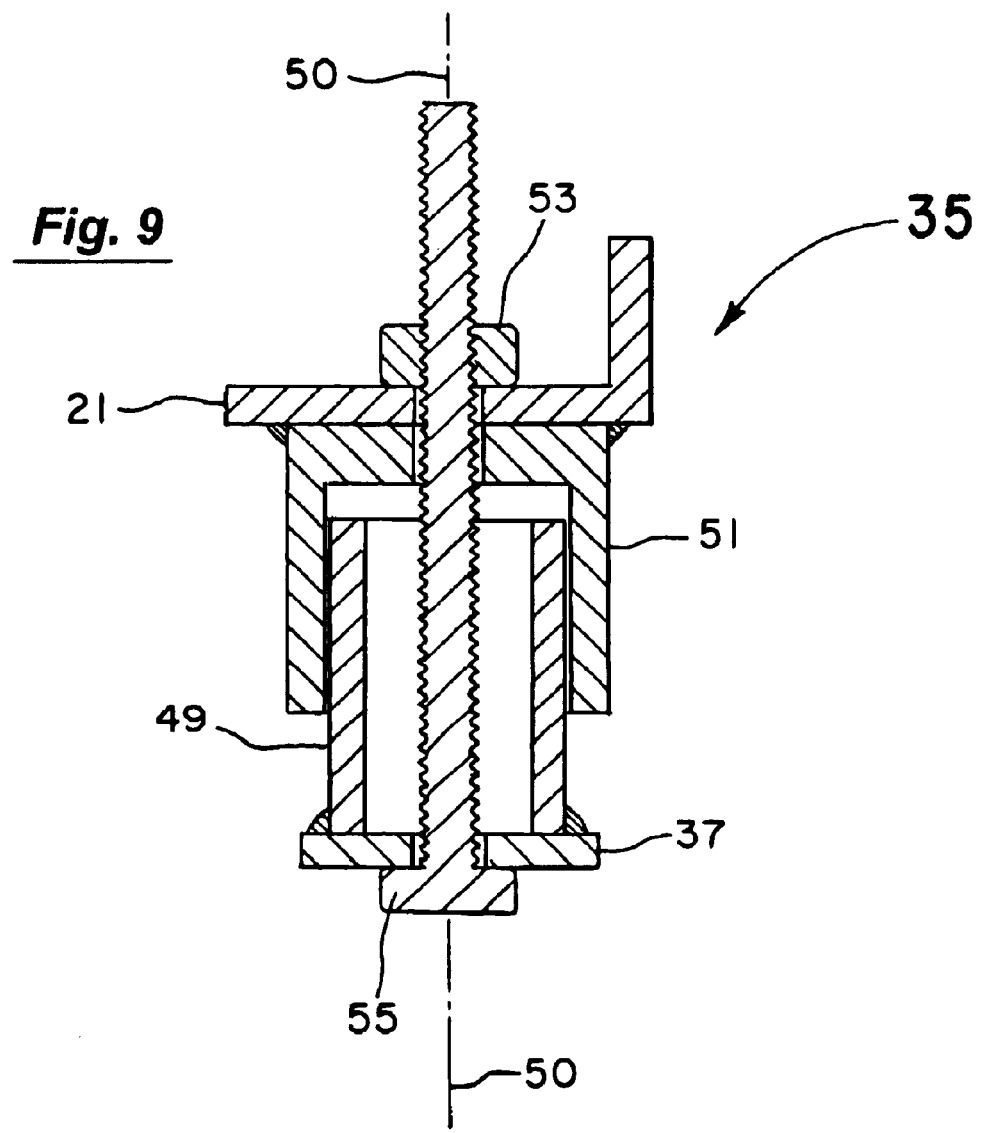

US 6,796,466 B2

SPARE TIRE CARRIER FOR A VEHICLE

RELATED APPLICATIONS

This application claims the benefit of U.S. Provisional Patent Application Ser. No. 60/244,033 filed Oct. 27, 2000.

BACKGROUND OF THE INVENTION

1. Field of the Invention

This invention relates to the field of carriers for the spare tire of a vehicle and more particularly to the field of carriers for heavier, oversized spare tires for sport utility vehicles.

2. Discussion of the Background

Most sport utility vehicles mount the spare tire directly on the rear gate of the vehicle with only the original equipment hinges to support the full weight of the rear gate and tire. The hinges in this regard are specifically designed to be able to carry this weight without distorting. However, many vehicle owners like to use oversized tires in place of the original ones and such oversized tires can weigh significantly more that the originals. For example, an original equipment tire and its wheel may weigh 40 pounds versus 60 pounds or more for an oversized one. This puts more weight on the hinges than they were designed to support. Such extra weight can then bend or distort the hinges causing their rotational axes to become misaligned with each other and the vertical. This in turn can cause the rear gate to sag and become misaligned with the vehicle opening making it difficult to close and lock. Often, the open end of the sagging rear gate must be physically lifted up by the user as it is being shut so that it will close and lock properly.

With these and other problems in mind, the present invention was developed. With it, a carrier is provided for the spare tire that helps to prevent any distortion of the hinges and any sag in the rear gate even with heavier, oversized tires.

SUMMARY OF THE INVENTION

This invention involves a carrier for the spare tire of a sport utility vehicle. The carrier is specifically designed for use with heavier, oversized tires that would otherwise tend to distort or bend the original equipment hinges of the rear gate. The carrier includes a pair of additional hinges mounted to the vehicle body just outside the rear gate and an arrangement of leg members that moves in unison with the rear gate as it is opened and closed. The spare tire is mounted on the arrangement of leg members and in use, the carrier preferably transfers about half of the weight of the spare tire away from the rear gate to the vehicle body.

The arrangement of leg members of the carrier includes an adjustable leg member which not only helps to properly align the spare tire with the vertical but also can be used to correct or offset any sag that might develop in the rear gate. The adjustable leg can further be used to vary the relative amounts of the tire's weight being supported by the gate including its hinges versus being supported by the body of the vehicle at the hinges for the carrier. Additionally, the adjustable leg member can be used to tightly draw the carrier against a resilient stop member on the gate. This helps to keep the carrier and the spare tire mounted to it from rattling or vibrating when the vehicle is driven. A further mechanism is also provided on the carrier which can be adjusted to allow the carrier to be used with a variety of tires of different widths.

BRIEF DESCRIPTION OF THE DRAWINGS

FIG. 8 also illustrates how the one leg member of the upper set is preferably held tightly against the resilient stop member on the gate to limit any vibration of the carrier and the spare tire mounted to it when the vehicle is being driven.

FIG. 9 is an enlarged view taken along line 9—9 of FIG. 3 showing the adjustable mechanism that allows tires of different widths to be mounted on the carrier of the present invention.

DETAILED DESCRIPTION OF THE PREFERRED EMBODIMENTS

Figure 1:
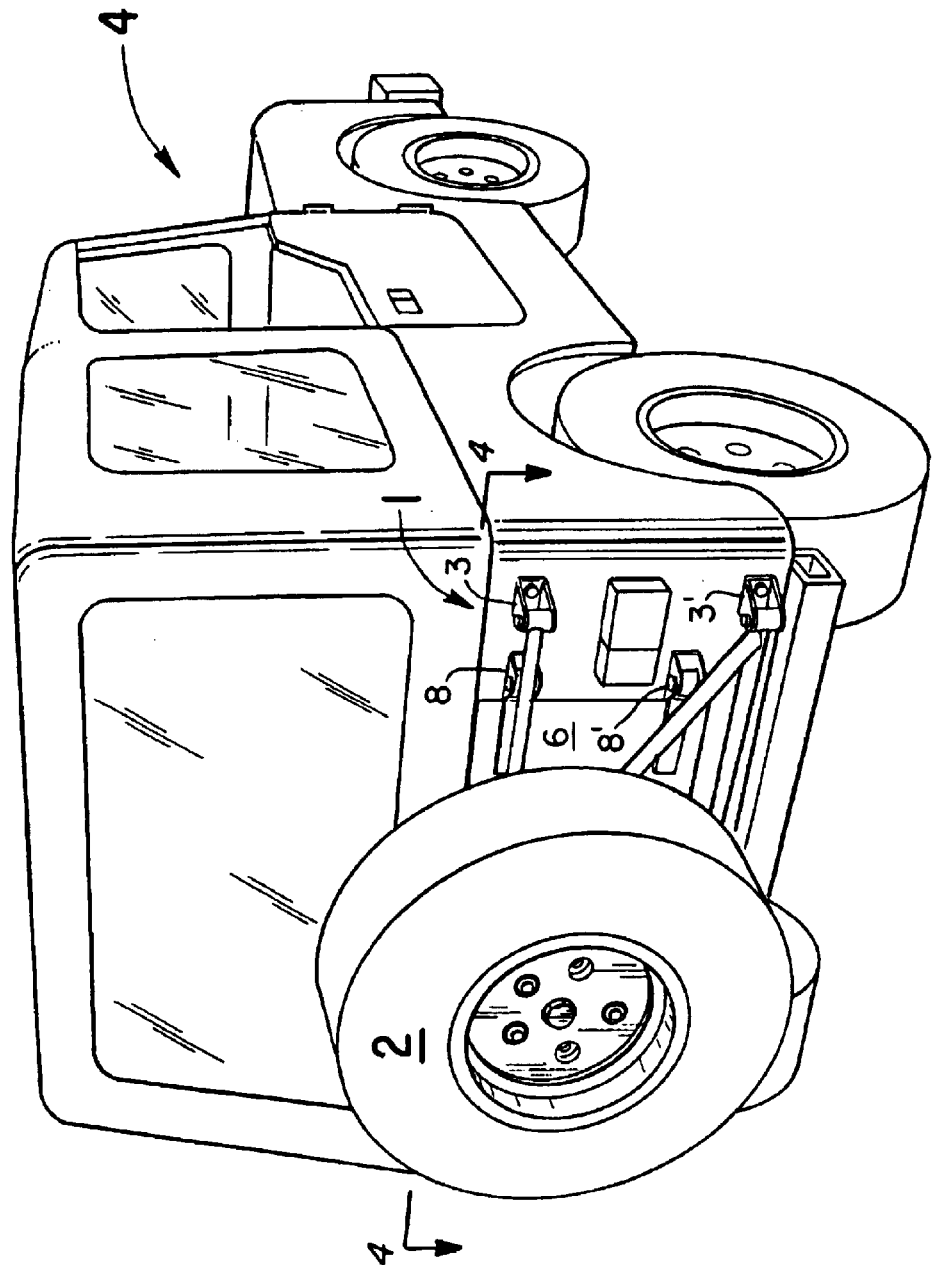
FIG. 1 is a perspective view of a sport utility vehicle with the carrier of the present invention in use carrying an oversized spare tire.

The present invention is directed to a carrier 1 for the spare tire 2 of a sport utility vehicle 4. As briefly discussed above, most such vehicles 4 are designed to carry the original equipment, spare tire directly on the rear gate 6 in FIG. 1 with only the original equipment hinges or pivot members 8 and 8' to support the entire weight of the rear gate 6 and spare tire. However, many vehicle owners like to use oversized tires such as 2 in FIG. 1 in place of the original ones. Such oversized tires 2 can be significantly heavier that the original tires. For example, an original equipment tire and its wheel may weigh 40 pounds versus 60 pounds or more for an oversized one. This puts more weight on the original equipment hinges 8 and 8' than they were designed to handle. The extra weight can then distort or bend the hinges 8 and 8' (particularly the upper hinge 8) and misalign the axes of the hinges 8 and 8' from each other and from the vertical axis 10 in FIG. 2. This in turn can cause the rear gate 6 to sag, misaligning it and its latching arrangement 12 of FIG. 2 with the vehicle opening 14. Closing and locking the rear gate 6 can then become difficult. Often, the open or free end of the sagging rear gate 6 adjacent the latching arrangement 12 must be physically lifted up by the user as it is being shut so the rear gate 6 will close and lock properly in the vehicle opening 14.

To overcome these problems, the present invention was developed. With it, approximately half of the weight of the oversized tire 2 of FIG. 1 is transferred from the rear gate 6 and original equipment hinges 8 and 8' to the body of the vehicle 4 at hinges 3 and 3' (see FIG. 1). This essentially eliminates any tendency of the original equipment hinges 8 and 8' to distort and any tendency of the rear gate 6 to sag and become misaligned so as not to close and lock properly. The carrier 1 of the present invention also moves in unison with the rear gate 6 as the rear gate 6 is opened and closed for ease of operation.

Figure 2:
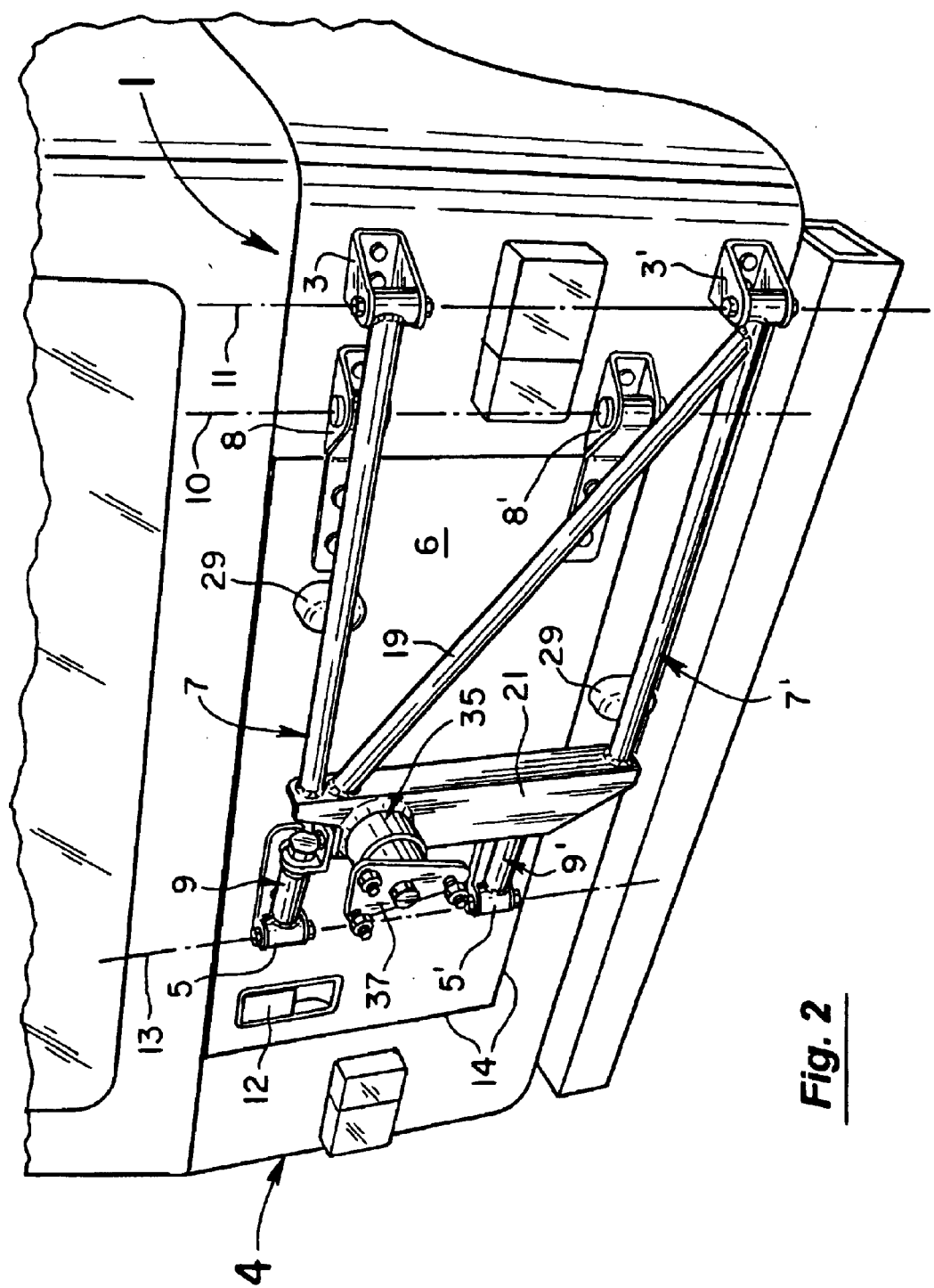
FIG. 2 is a perspective view similar to FIG. 1 but with the tire removed to better show the structure of the carrier.
Figure 3:
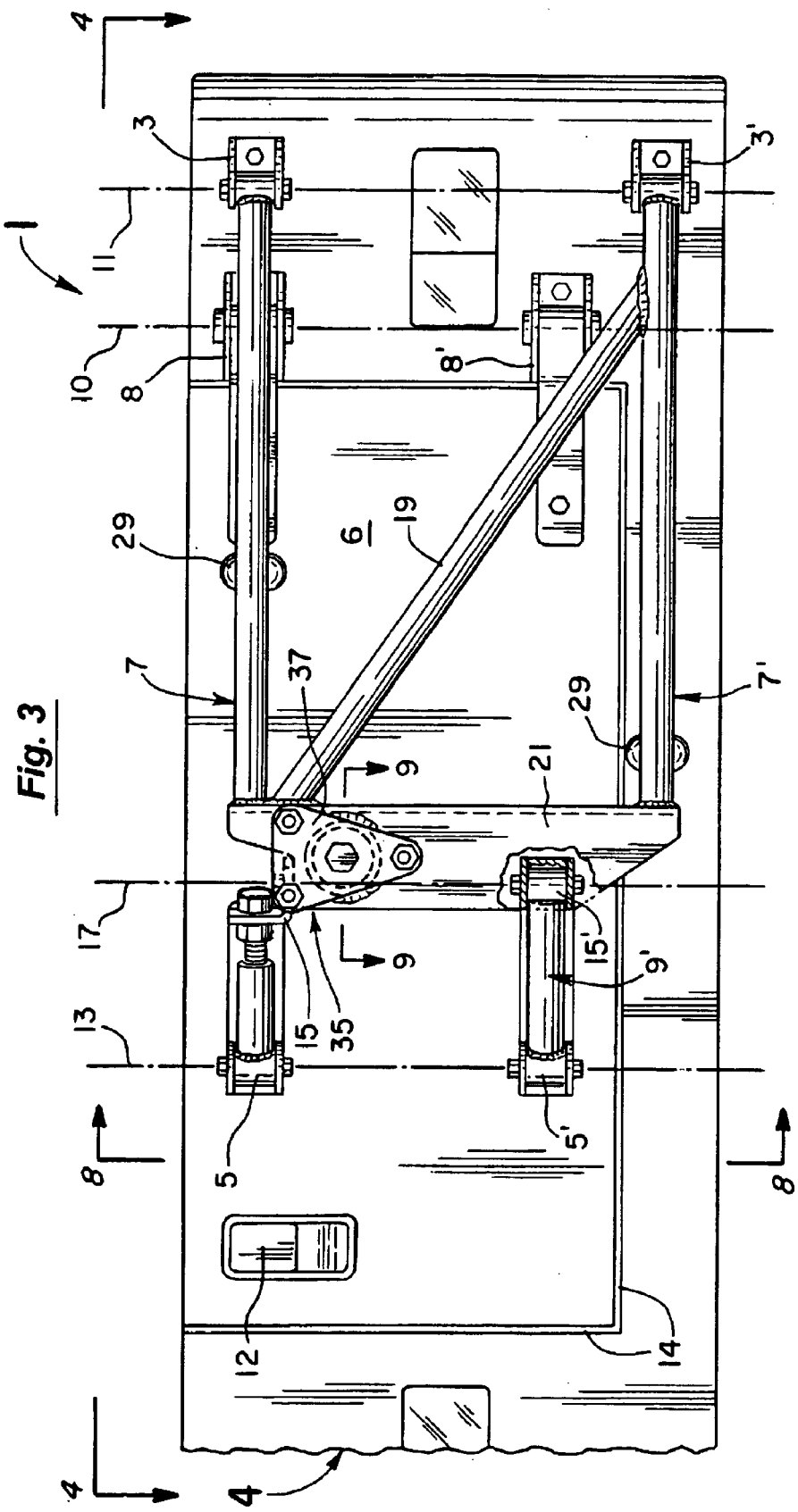
FIG. 3 is a rear elevational view of the carrier of FIG. 2.
Figure 4:
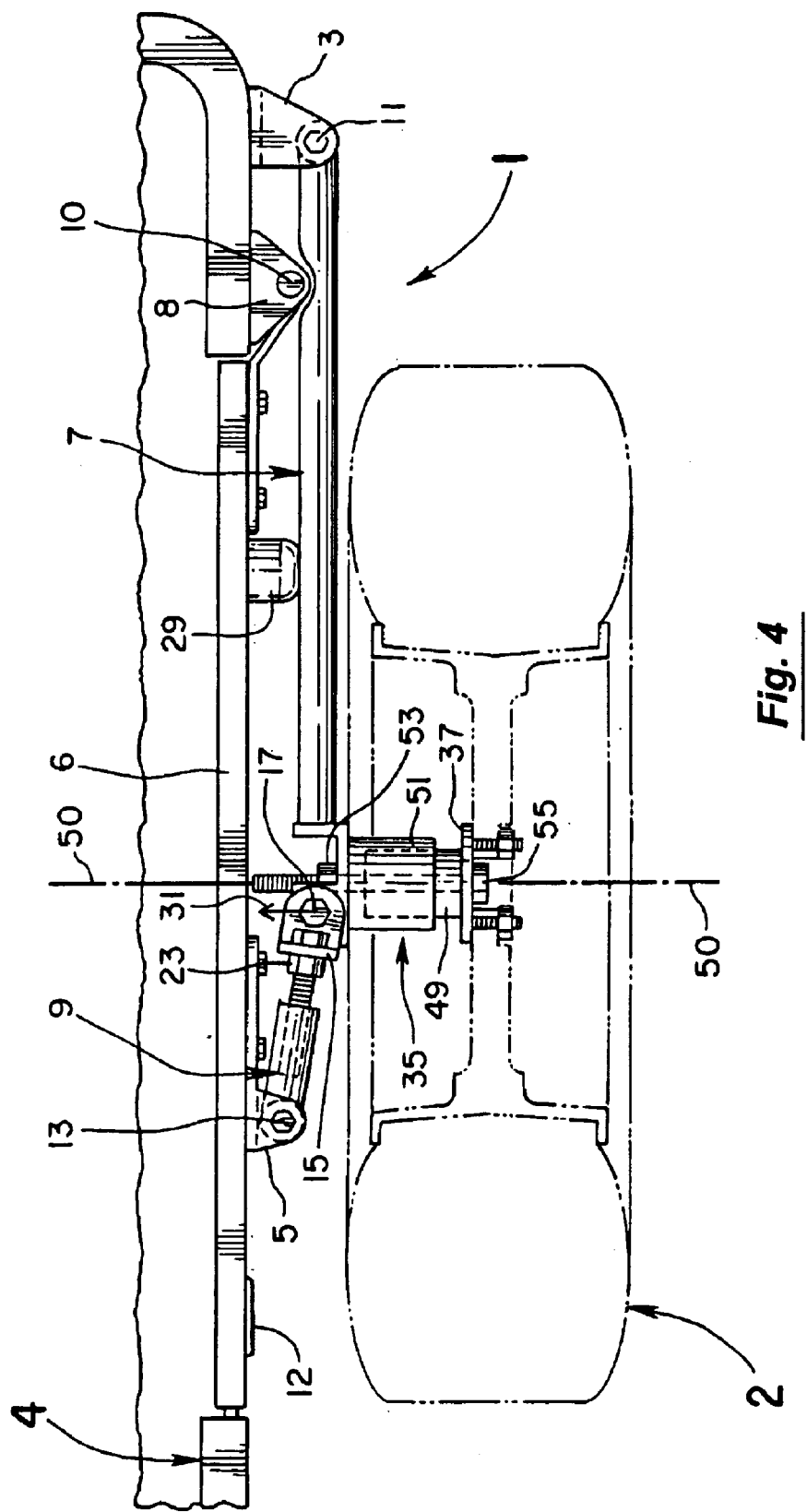
FIG. 4 is a top view taken generally along line 4—4 of FIGS. 1 and 3 showing the rear gate in its closed position.

More specifically, the carrier 1 of the present invention as perhaps best seen in FIGS. 2 and 3 mounts additional hinges 3 and 3' directly to the body of the vehicle 4 just outside the original equipment hinges 8 and 8'. Inner, additional hinges 5 and 5' are also mounted to the rear gate 6 adjacent the latching arrangement 12. Between the upper hinges 3 and 5, leg members 7 and 9 extend with one end of leg 7 being mounted to the hinge 3 for pivotal movement about the vertical axis 11 (see FIGS. 2 and 3). Similarly, one end of the other leg 9 is mounted to the hinge 5 for pivotal movement about the vertical axis 13. As best seen in FIGS. 3 and 4, the legs 7 and 9 are then joined to each other at bracket 15 for pivotal movement relative to each other about the vertical axis 17. Corresponding lower legs 7' and 9' in FIG. 3 are similarly mounted to hinges 3' and 5' and to each other at 15' for pivotal movement about the axes 11, 13, and 17. Legs 7 and 7' are preferably parallel to each other as are legs 9 and 9'. A lower resilient stop 29 is also preferably provided on the vehicle body just below the gate opening 14 (see FIGS. 2 and 3) to abut against the lower leg 7' when the gate 6 is in its closed position.

Figure 5:
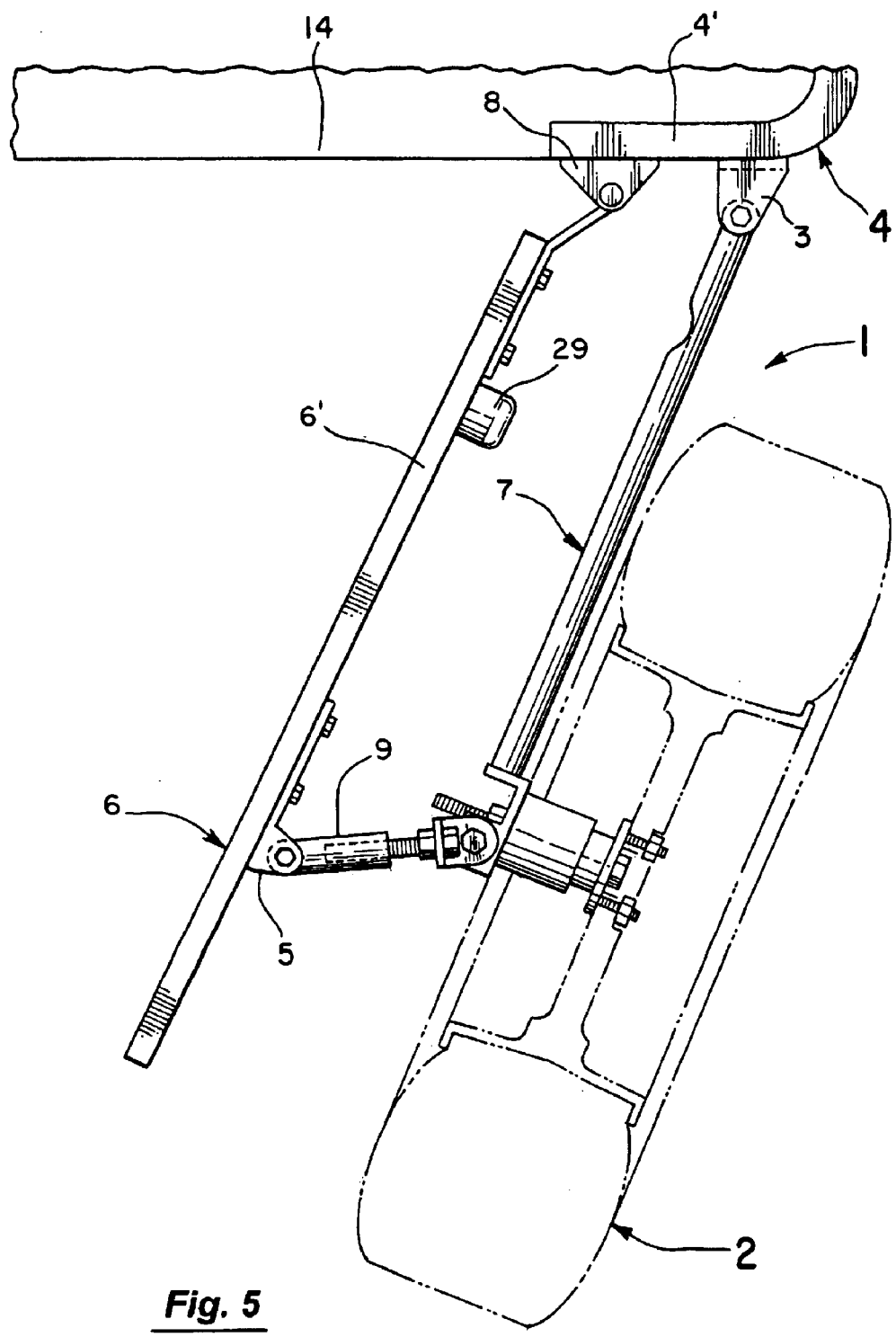
FIG. 5 is a top view similar to FIG. 4 but with the rear gate in its open position.

As best seen in FIG. 5, the upper set of leg members 7 and 9 essentially forms a quadrilateral shape with the body portion 4' of the vehicle 4 (substantially between the hinges 3 and 8) and portion 6' of the rear gate 6 (substantially between the hinges 8 and 5). In a like manner, the lower set of leg members 7' and 9' of FIG. 3 forms a similar quadrilateral shape. Consequently, when the rear gate 6 is swung open as in FIG. 5 to permit access to the interior of the vehicle 4 (through the opening 14 defined by the vehicle body portions including portion 4'), the carrier 1 and oversized tire 2 easily move in unison with the rear gate 6. In doing so and even when the leg member 9 is adjusted as explained below, the carrier 1 preferably always maintains the leg member 7 in a substantially parallel relationship with the gate 6 (see FIGS. 4 and 5).

Figure 6:
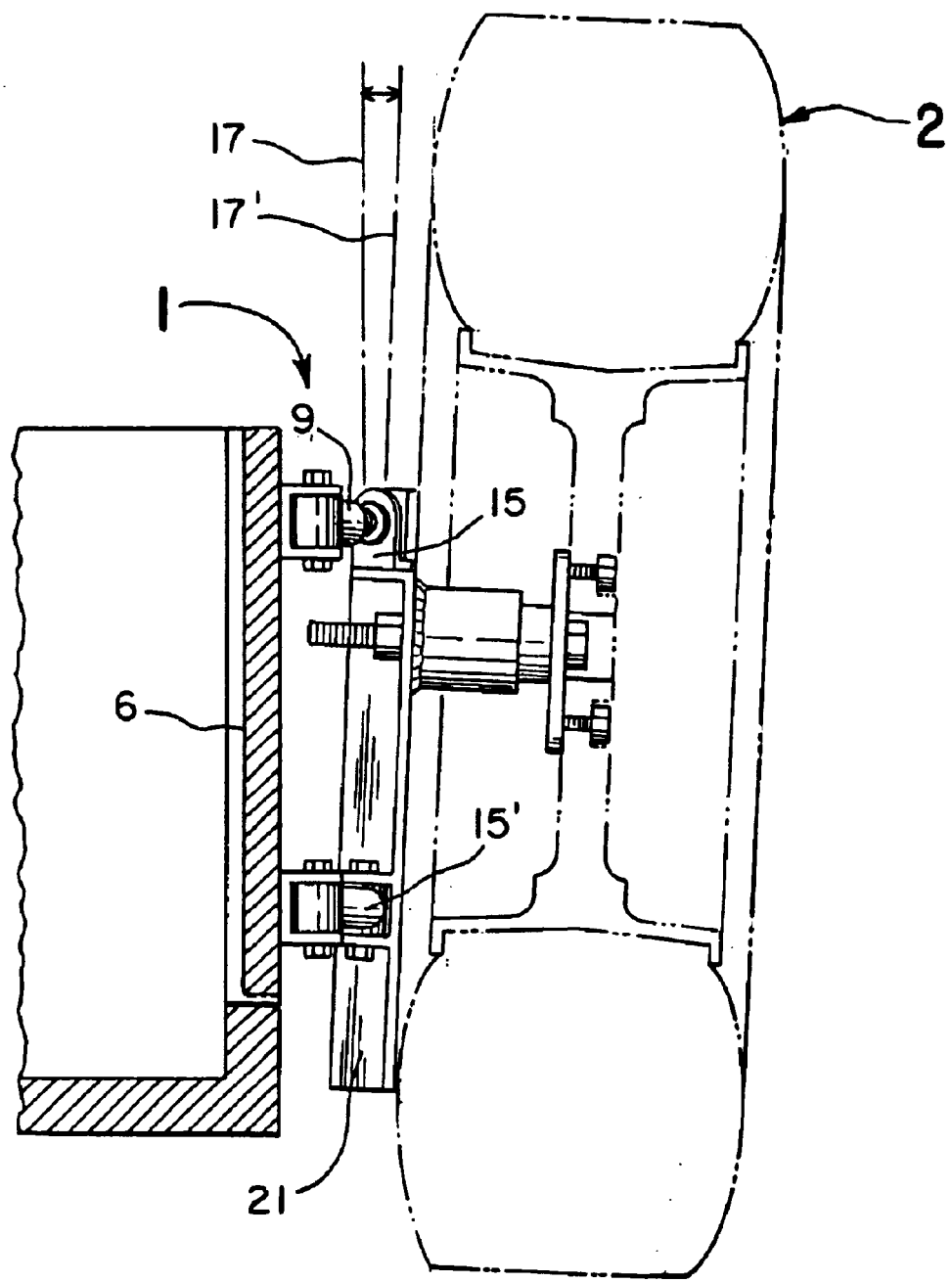
FIG. 6 is a side elevational view of the oversized tire mounted on the carrier and slightly cocking the carrier and tire rearwardly from the vertical.
Figure 7:
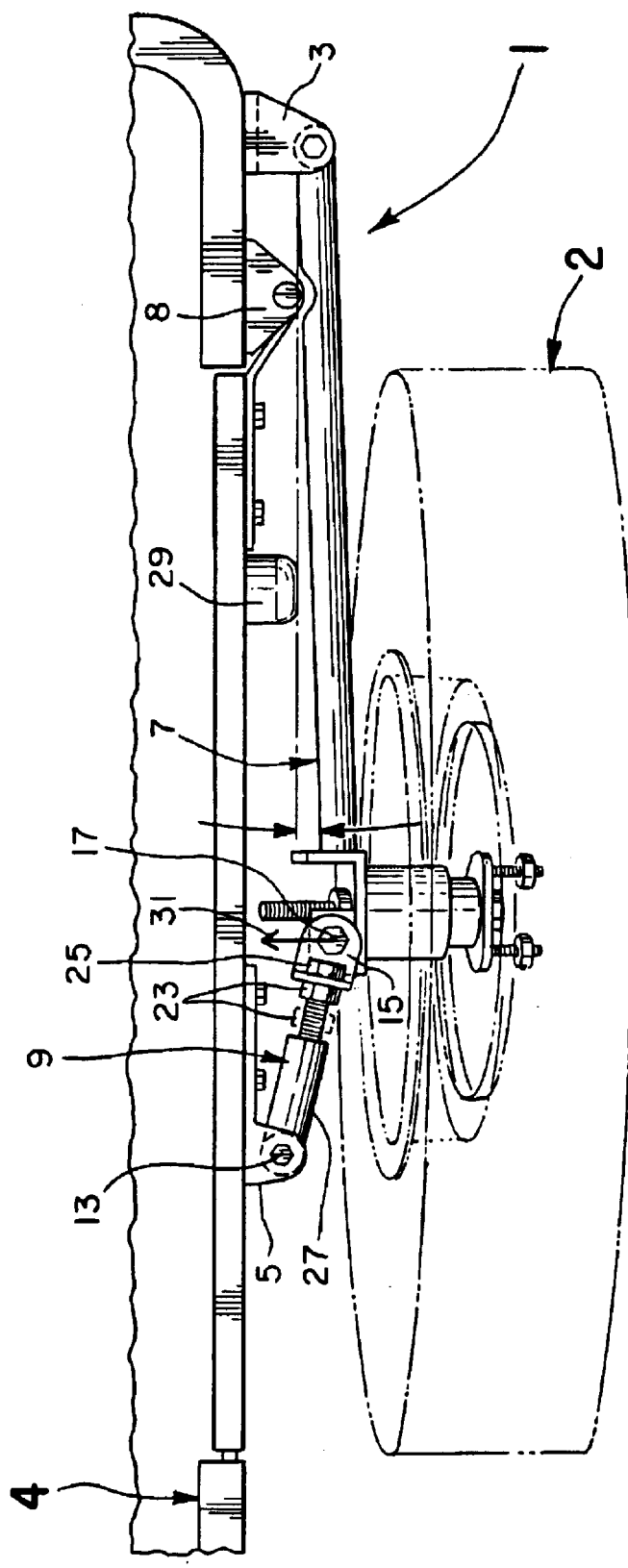
FIG. 7 is a top view of the tire in the cocked position of FIG. 6.

With oversized tires such as 2 and even with a reinforcing carrier like 1, the weight of the tire 2 can still tilt or cock the upper legs 7 and 9 out of proper alignment with the lower legs 7' and 9' and the gate 6 of the vehicle 4. This is illustrated in FIGS. 6 and 7 in which the clockwise torque of the cantilevered tire 2 on the carrier 1 in FIG. 6 has moved the upper legs 7 and 9 (see also FIG. 7) outwardly to the position of these FIGS. 6 and 7. The axis 17 of the joints 15 and 15' in FIG. 6 between the upper legs 7 and 9 and lower legs 7' and 9' can then become misaligned with the true vertical. The preferred vertical axis 17 in FIG. 6 is then tilted or cocked from the vertical to the position of axis 17' in FIG. 6. The torque of the cantilevered tire 2 can also distort the individual axes of the joints 15 and 15' from each other. This outward torquing or cocking essentially involves the entire carrier 1 including the diagonal cross member 19 (see FIGS. 2 and 3) and vertical connecting piece 21. These misalignments caused by the torque of the tire 2 create undesirable stresses in the carrier 1 and can impede its operation by causing the various hinges and joints to bind on one another. They also can lead to the physical distortion or bending of some or all of the hinges (including the original equipment hinges 8 and 8') and joints of the structure supporting the spare tire 2 and rear gate 6.

Figure 8:
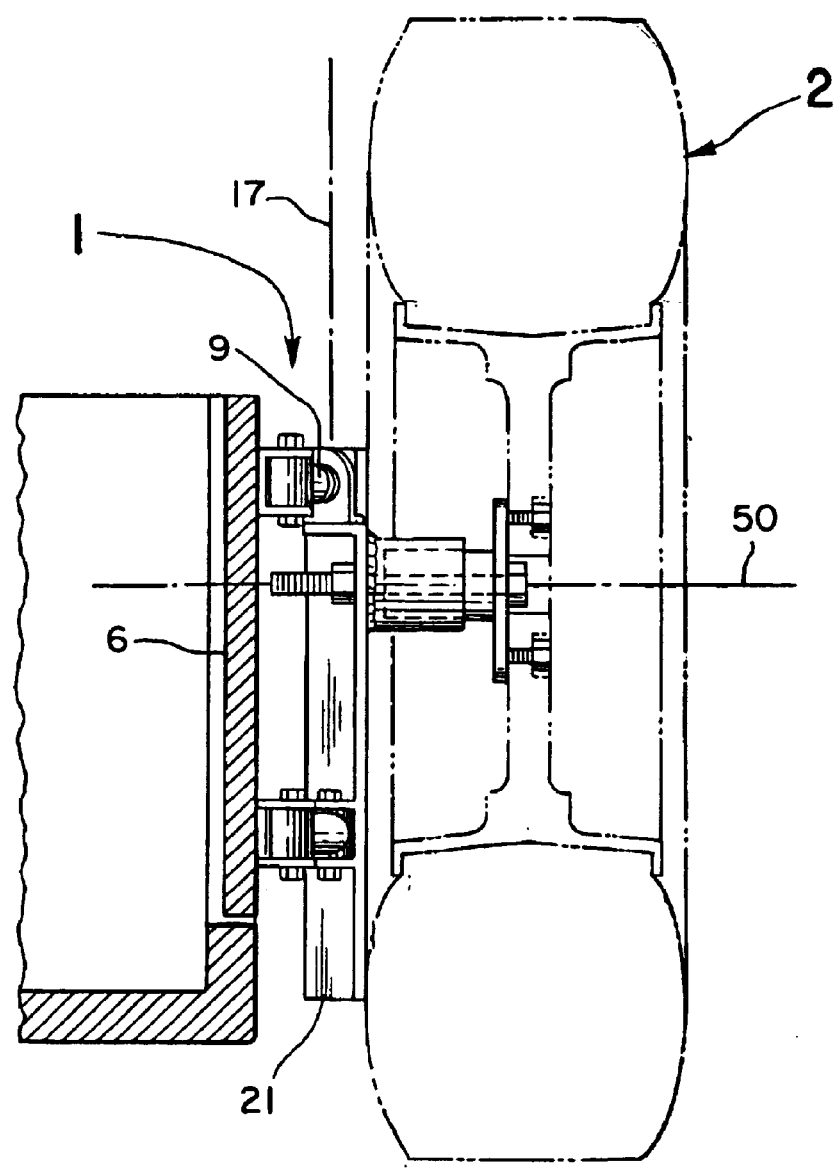
FIG. 8 is a view similar to FIG. 6 but showing the tire after the carrier has been adjusted to bring the tire and upper set of leg members of the carrier to the preferred vertical alignment.

To compensate for this outward tilting or cocking of the rear tire 2 in FIG. 6, the upper leg 9 of the carrier 1 is made to be linearly adjustable along its length between the axes 13 and 17. More specifically as illustrated in FIG. 7, the lock nut 23 of the leg 9 can be loosened and moved to the dotted position of FIG. 7 after which the bolt 25 can be rotated to draw the bolt 25 into the cylinder 27. This will shorten the leg 9 and draw the legs 7 and 9 and tire 2 inwardly to the desired position of FIGS. 4 and 8. In the desired position of FIG. 4, the leg 7 is pressed tightly against the elastic stop member 29 on the rear gate 6 and is essentially parallel to the rear gate 6. The upper legs 7 and 9 are then vertically aligned with the lower legs 7' and 9' and the tire 2 is essentially vertical as in FIG. 8. Preferably, the adjustable leg 9 is shortened so that the resilient stop 29 is actually contacted by the leg 7 just before the gate 6 reaches its closed and latched position of FIG. 4. The final movement of the gate 6 to its closed and latched position of FIG. 4 then serves to slightly compress the resilient stop 29 and firmly bias the leg 9 against the stop 29 to keep the carrier 1 and spare tire 2 from rattling or vibrating as the vehicle 4 is driven.

It is noted at this point that the base of the hinge 5 in FIG. 4 is purposely designed to be shorter than the base of the hinge 3. Consequently, the axis 13 of the hinge 5 is positioned closer to the rear gate 6 than the axis 11 of the hinge 3. This serves to provide an angle between the longitudinal or linear axes of the elongated legs 7 and 9 at the joint 15. This angle is preferably present even when the adjustable leg 9 is fully retracted to draw leg 7 tightly against the stop member 29 on the rear gate 6 as illustrated in FIG. 4. Stated another way, the distance between the axes 11 and 13 is preferably always less than the combined distance between the axes 11 and 17 plus the distance between the axes 13 and 17. This then serves to maintain the desired angle discussed above between the legs 7 and 9.

Preferably, this is accomplished by shortening the base of the hinge 5 as discussed above but it could also be accomplished by increasing the distance the stop 29 extends outwardly from the gate 6. In either manner and because of this angle, the shortening of the adjustable leg 9 can always provide an inward force vector 31 (see FIG. 4) on the leg 7 at axis 17, even in the fully retracted position of FIG. 4. If the legs 7 and 9 were axially aligned or collinear in the position of FIG. 4, it would be virtually impossible to fully draw the leg 7 tightly against the stop 29 in FIG. 4 from the position of FIG. 7 as the inward force vector at 31 perpendicular to the rear gate 6 would essentially approach zero. However, because there preferably is always this slight angle, an inward force at 31 is continually present to positively bias the leg 7 in the preferred position of FIG. 4 tightly against the resilient stop member 29. In this biased position as indicated above, there is less of a tendency for the carrier 1 and spare tire 2 rattle or vibrate as the vehicle 4 is driven. This then helps to maintain the integrity and alignments of the entire arrangement and its parts.

It is noted that the stop member 29 could be mounted directly on the leg 7 if desired rather than on the gate 6. In this regard, a substantially vertical alignment of the spare tire 2 is preferred to avoid having the spare tire 2 provide an undesirable, rearward torque on the carrier 1. However, equally important in the preferred embodiment is that the carrier 1 is biased against the stop member 29 to limit any vibration as the vehicle 4 is driven. This biasing may actually occur before or after the tire 2 is aligned in a truly vertical position. Nevertheless, it is in making this adjustment to the vertical alignment of the spare tire 2 that the proper biasing against the resilient stop member 29 is achieved.

The adjustable leg 9 also offers a further advantage should any of the hinges or joints become physically bent or distorted and the rear gate 6 sag downwardly at its free end. In such an event, the leg 9 can be shortened to physically raise the free end of the rear gate 6 adjacent the latching arrangement 12 back up into proper alignment with the vehicle opening 14 of FIG. 3. The rear gate 6 in this regard tends to sag or rotate counterclockwise about the lower hinges 8' and 3' and the adjustable leg 9 can then be used to rotate the rear gate 6 clockwise primarily at hinge 8' back into proper alignment. It is noted that if the carrier 1 is just used to offset the sag or is primarily used to do so, it may be advantageous to modify the structure of the carrier 1 (e.g., remove the stop member 29) so the legs 7 and 9 can assume a straight or collinear alignment with each other. It is also noted that this adjustment feature of the carrier 1 of the present invention is independent of its operation to support and bring the tire 2 into proper, front-to-back vertical alignment as discussed above in reference to FIGS. 6–8. That is, this operation of the adjustable leg 9 to selectively raise the free end of the rear gate 6 should it sag can be utilized whether or not the tire 2 is on the carrier 1. This operation as is evident could also be used to lower the free end of the gate 6 if necessary.

Such adjusting additionally has the effect of varying the relative amounts of the weight of the gate 6 carried by the gate hinges 8 and 8' versus the hinges 3 and 3' for the carrier 1. This ability to adjust the relative amounts is perhaps more important when the gate 6 has the additional weight of a tire 2 supported in part on the gate including its hinges 8 and 8'. That is, normally a first portion of the tire's weight is being supported by the gate 6 including the hinges 8 and 8' therefor and a second portion of the tire's weight is being supported by the body of the vehicle 4 at a location (i.e., hinges 3 and 3') spaced from the hinges 8 and 8' for the gate 6. Preferably, this weight distribution is about 50/50. However, with the adjustable arrangement of the present invention, it is possible to physically vary the relative amounts of the tire's weight carried by the gate 6 including the hinges 8 and 8' therefor and by the body of the vehicle 4 at the carrier hinges 3 and 3'. For example, the weight distribution could be varied to have 60% or more of the tire's weight supported by the vehicle body at the carrier hinges 3 and 3'. Such hinges 3 and 3' in this regard are preferably anchored to the vehicle frame and/or rear sections of the sports bar in addition to being of stronger construction than the original equipment hinges 8 and 8' for the gate 6. Further, the desired weight shift by adjusting leg member 9 is preferably accomplished within the normal tolerances of the hinges without creating any undesirable binding forces on the hinges. It is also noted at this point that in this discussion as well as the others above, the leg member 9 is primarily described as being the adjustable member. However, the desired adjustment could be accomplished by making one or more of the other leg members (e.g., member 7) adjustable if preferred.

The carrier 1 of the present invention further includes a tire mounting structure or mechanism 35 as best illustrated in FIGS. 2–4 and 9 that enables the carrier 1 to handle spare tires of different widths. This adjustable mechanism 35 is mounted to the vertical piece 21 (see FIGS. 2 and 3) and includes a conventional lug nut plate 37 securable to the wheel hub of the tire 2 (see FIG. 4). To accommodate tires of different widths, the mechanism 35 is provided with inner and outer, concentric, cylindrical members 49 and 51 (see FIG. 4 and the enlarged view of FIG. 9 which is taken along line 9—9 of FIG. 3). In operation, the inner cylindrical member 49 can be moved axially in a telescoping manner along axis 50 relative to the outer cylindrical member 51 to accommodate tires of different widths. Preferably, the member 49 is initially removed completely from the member 51 by removing the lock nut 53 in FIG. 9. Once separated from the member 51, the member 49 can be freely manipulated to position and secure the hub of the wheel of the tire 2 to the plate 37 on the member 49. Thereafter, the tire 2 with the cylindrical member 49 attached to it can be lifted and moved to align the members 49 and 51. The member 49 attached to the tire 2 is then manually telescoped along the substantially horizontal axis 50 into the concentric, cylindrical member 51 and secured in place by lock nut 53 in the position of FIG. 4. In the preferred manner of operation, the member 49 is telescoped into the member 51 until the side of the tire 2 abuts the vertical piece 21 (see FIG. 8) or some other member of the carrier 1 such as the leg member 7. Such abutting contact is desirable to help prevent the tire 2 from rotating relative to the carrier 1.

While several embodiments of the present invention have been shown and described in detail, it to be understood that various changes and modifications could be made without departing form the scope of the invention. As for example, the invention is primarily described as it relates to supporting a spare tire but the object being supported could be any desired item such as a bike or luggage rack carried directly on the carrier 1 or on the spare tire 2 as mounted on the carrier 1.

I claim:

1. A spare tire carrier for a vehicle having a rear gate mounted for pivotal movement between open and closed positions, said spare tire carrier comprising:

a first leg member having a first end pivotally mountable to the vehicle, said first leg member having mounting structure on which a spare tire is mountable, and a second leg member having a first end pivotally connected to a second end of the first leg member and a second end pivotally mountable to the rear gate for maintaining a substantially parallel relationship between the first leg member and the rear gate during pivotal movement thereof, at least one of the first and second leg members being adjustable in length for shortening the length thereof thereby offsetting sagging of said rear gate upon mounting the spare tire on the mounting structure.

2. The spare tire carrier of claim 1 wherein said rear gate, said first leg member, and said second leg member are respectively mounted for pivotal movement about substantially vertical axes.

3. The spare tire carrier of claim 1 wherein said rear gate (6) and said first leg member (7) are respectively mountable to said vehicle for pivotal movement about substantially vertical first (10) and second (11) axes and said second leg member (9) is respectively mountable to said rear gate (6) and to said first leg member (7) for pivotal movement about substantially vertical third (13) and fourth (17) axes.

4. The spare tire carrier of claim 3 wherein the length of said at least one of said first and second leg members (7,9) is adjustable between at least one of the respective pair of the second (11) and fourth (17) axes and of the third (11) and fourth (17) axes.

5. The spare tire carrier of claim 4 wherein said adjustable one of said leg members is said second leg member (9) between said third (13) and fourth (17) axes.

6. The spare tire carrier of claim 3 wherein the distance between the second and third axes (11,13) is less than the combined distance between the second and fourth axes (11,17) plus the distance between the third and fourth axes (13,17).

7. The spare tire carrier of claim 6 wherein the adjustable length of said one leg member adjusts said combined distance.

8. The spare tire carrier of claim 3 further including third and fourth leg members (7',9'), said third leg member (7') being mountable to said vehicle for pivotal movement about said second axis (11), said fourth leg member being mountable to said gate for pivotal movement about said third axis (13), said third and fourth leg members further being mountable for pivotal movement relative to each other about said fourth axis (17) with said first and third leg members (7,7') substantially parallel to each other and with said second and fourth leg members (9,9 ') substantially parallel to each other.

9. The spare tire carrier of claim 1 wherein said spare tire is mountable to said spare tire carrier by at least first and second members (49,51) mounted for slidable movement relative to each other along a fifth axis (50).

10. The spare tire carrier of claim 9 wherein said first and second members (49,51) are concentrically mounted relative to each other.

11. The spare tire carrier of claim 9 wherein said fifth axis is substantially horizontal.

12. The spare tire carrier of claim 9 wherein said spare tire is secured to at least one of said first and second members (49,51).

13. The spare tire carrier of claim 1 further including a stop member (29) mounted on said rear gate, said stop member being spaced from said spare tire carrier when said rear gate is in said open position and said stop member abutting at least one of said leg members (7,9) when said rear gate is in said closed position.

14. The spare tire carrier of claim 13 wherein said stop member abuts said first leg member (7) when said rear gate is in said closed position.

15. In a vehicle having a rear gate mounted to the body of the vehicle for pivotal movement about a first substantially vertical axis (10) between an open position permitting access to the interior of the vehicle through an opening defined at least in part by portions of the vehicle body and a closed position preventing access through said opening, said gate having a free end spaced from said first axis (10), the improvement including an arrangement to selectively raise the free end of said gate relative to the opening in said vehicle to properly align said gate including the free end thereof with the opening in said vehicle wherein the arrangement includes first and second leg members (7,9), said first leg member (7) being mounted to said body for pivotal movement about a second substantially vertical axis (11), said second leg member (9) being mounted to said gate (6) for pivotal movement about a third substantially vertical axis (13), said first and second leg members (7,9) being further mounted to each other about a fourth substantially vertical axis (17) wherein the length of at least one of said leg members (7,9) is adjustable between at least one of the respective pair of the second and fourth axes (11,17) and of the third and fourth axes (13,17) to selectively raise the free end of said gate relative to the opening in said vehicle to properly align said gate including the free end thereof with the opening in said vehicle.

16. The improvement of claim 15 wherein said adjustable one of said leg members is said second leg member (9) between said third and fourth axes (13,17).

17. The improvement of claim 15 wherein the distance between the second and third axes (11,13) is less than the combined distance between the second and fourth axes (11,17) plus the distance between the third and fourth axes (13,17).

18. The improvement of claim 17 wherein the adjustable length of said one leg member adjusts said combined distance.

19. The improvement of claim 15 further including third and fourth leg members (7',9'), said third leg member (7') being mounted to said body for pivotal movement about said second axis (11), said fourth leg member being mounted to said gate for pivotal movement about said third axis (13), said third and fourth leg members further being mounted for pivotal movement relative to each other about said fourth axis (17) with said first and third leg members (7,7') substantially parallel to each other and with said second and fourth leg members (9,9') substantially parallel to each other.

20. A spare tire carrier for a vehicle, said vehicle having a rear gate and body with portions defining an opening for said gate, said gate being mounted to said body for pivotal movement about a first substantially vertical axis (10) between an open position permitting access to the interior of the vehicle through said opening and a closed position preventing access through said opening, said spare tire carrier including:

first and second leg members (7,9), said first leg member (7) being mountable to said body for pivotal movement about a second substantially vertical axis (11), said second leg member (9) being mounted to said gate (6) for pivotal movement about a third substantially vertical axis (13), said first and second leg members (7,9) being further mounted to each other about a fourth substantially vertical axis (17), said spare tire being mountable to said spare tire carrier wherein the length of at least one of said leg members (7,9) is adjustable between at least one of the respective pair of the second and fourth axes (11,17) and of the third and fourth axes (13,17) to adjust the vertical alignment of said spare tire and said spare tire carrier.

21. The spare tire carrier of claim 20 wherein said adjustable one of said leg members is said second leg member (9) between said third and fourth axes (13,17).

22. The spare tire carrier of claim 20 wherein the distance between the second and third axes (11,13) is less than the combined distance between the second and fourth axes (11,17) plus the distance between the third and fourth axes (13,17).

23. The spare tire carrier of claim 22 wherein the adjustable length of said one leg member adjusts said combined distance.

24. The spare tire carrier of claim 20 further including third and fourth leg members (7',9'), said third leg member (7') being mountable to said body for pivotal movement about said second axis (11), said fourth leg member being mountable for pivotal movement about said third axis (13), said third and fourth leg members further being mountable for pivotal movement relative to each other about said fourth axis (17) with said first and third leg members (7,7') substantially parallel to each other and with said second and fourth leg members (9,9') substantially parallel to each other.

25. The spare tire carrier of claim 24 wherein the alignment of said fourth substantially vertical axis (17) to a true vertical axis is adjustable.

26. The spare tire carrier of claim 25 wherein the alignment of said fourth axis (17) is adjustable by adjusting the length of said one of said leg members.

27. The spare tire carrier of claim 20 wherein said spare tire is mountable to said spare tire carrier by at least first and second members (49,51) mounted for slidable movement relative to each other along a fifth axis (50).

28. The spare tire carrier of claim 27 wherein said first and second members (49,51) are concentrically mounted relative to each other.

29. The spare tire carrier of claim 27 wherein said fifth axis is substantially horizontal.

30. The spare tire carrier of claim 27 wherein said spare tire is secured to at least one of said first and second members (49,51).

31. The spare tire carrier of claim 20 further including a stop member (29) mounted on said gate, said stop member being spaced from said spare tire carrier when said gate is in said open position and said stop member abutting at least one of said leg members (7,9) when said gate is in said closed position.

32. The spare tire carrier of claim 31 wherein said stop member abuts said first leg member (7) when said gate is in said closed position.

33. In a vehicle having a rear gate mounted by at least one pivot member to the body of the vehicle for pivotal movement about a first substantially vertical axis (10) and an object supported in part on said gate including said pivot member therefor and in part on the body of the vehicle at a location spaced from said pivot member for said gate, a first portion of the weight of the object being supported by said gate including said pivot member therefor and a second portion of the weight of the object being supported by said body at said spaced location, the improvement including an arrangement to selectively adjust the relative amounts of the first and second portions of the weight of the object respectively being supported by the gate including the pivot member therefor and by the body of the vehicle at said spaced location.

34. The improvement of claim 33 wherein the arrangement includes first and second leg members (7,9), said first leg member (7) being mountable to said body for pivotal movement about a second substantially vertical axis (11), said second leg member (9) being mountable to said gate (6) for pivotal movement about a third substantially vertical axis (13), said first and second leg members (7,9) being further mountable to each other about a fourth substantially vertical axis (17) wherein the length of at least one of said leg members (7,9) is adjustable between at least one of the respective pair of the second and fourth axes (11,17) and of the third and fourth axes (13,17) to selectively adjust the relative amounts of the first and second portions of the weight of the object respectively being supported by the gate including the pivot member therefor and by the body of the vehicle at said spaced location.

35. The improvement of claim 34 wherein said adjustable one of said leg members is said second leg member (9) between said third and fourth axes (13,17).

36. The improvement of claim 34 wherein the distance between the second and third axes (11,13) is less than the combined distance between the second and fourth axes (11,17) plus the distance between the third and fourth axes (13,17).

37. The improvement of claim 36 wherein the adjustable length of said one leg member adjusts said combined distance.

38. The improvement of claim 34 further including third and fourth leg members (7',9'), said third leg member (7') being mounted to said body for pivotal movement about said second axis (11), said fourth leg member being mounted for pivotal movement about said third axis (13), said third and fourth leg members further being mounted for pivotal movement relative to each other about said fourth axis (17) with said first and third leg members (7,7') substantially parallel to each other and with said second and fourth leg members (9,9') substantially parallel to each other.

* * * * *